J. C. FAIR & T. A. ANDERSON.
PUNCTURE PROOF TIRE.
APPLICATION FILED SEPT. 9, 1914.
1,181,069. Patented Apr. 25, 1916.
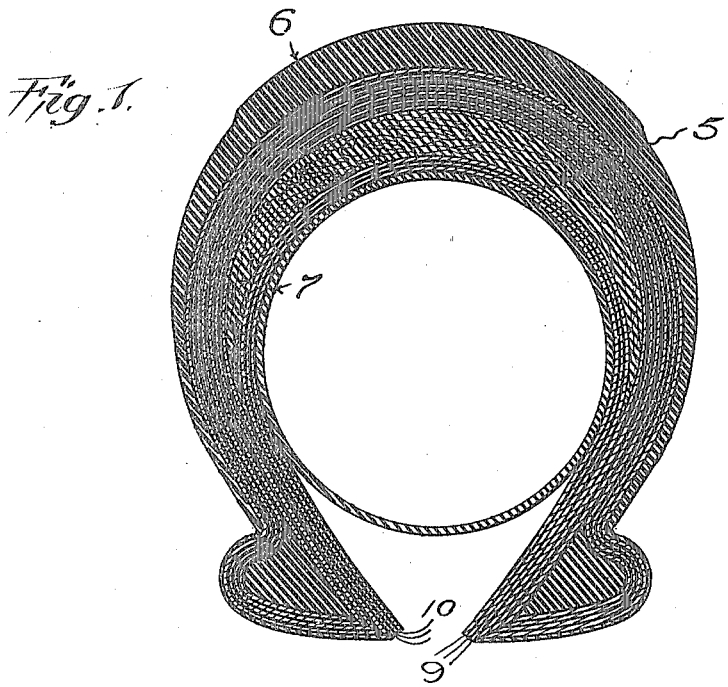
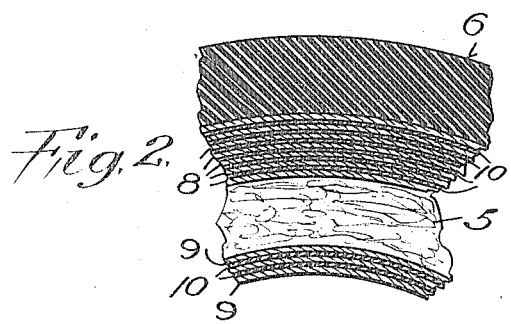
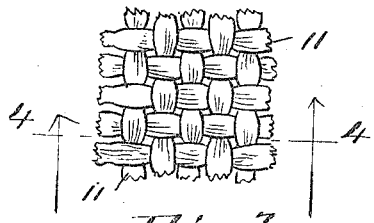
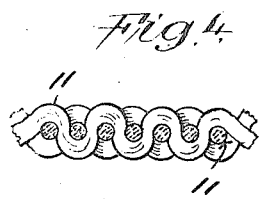

UNITED STATES PATENT OFFICE.

JOSEPH CLIFTON FAIR AND THEODORE A. ANDERSON, OF CHICAGO, ILLINOIS, ASSIGNORS, BY MESNE ASSIGNMENTS, TO PREMIUM PUNCTUREPROOF TIRE COMPANY, A CORPORATION OF MAINE.

PUNCTURE-PROOF TIRE.

1,181,069.      Specification of Letters Patent.      Patented Apr. 25, 1916.

Application filed September 9, 1914. Serial No. 860,956.

*To all whom it may concern:*

Be it known that we, JOSEPH C. FAIR and THEODORE A. ANDERSON, citizens of the United States, residing at Chicago, county of Cook, State of Illinois, have made a certain new and useful Invention in Puncture-Proof Tires, of which the following is a specification.

This invention relates to pneumatic tires and particularly to tires of this class which are puncture proof.

The object of the invention is to provide a puncture proof tire which is of simple structure, economical to manufacture, light in weight, efficient and durable in use.

The invention consists substantially in the construction, combination, location and relative arrangement of parts, all as will be more fully hereinafter set forth, as shown in the accompanying drawing, and finally pointed out in the appended claim.

Referring to the accompanying drawing: Figure 1 is a view in transverse section of a pneumatic puncture proof tire constructed in accordance with our invention. Fig. 2, is a broken view in longitudinal section through the tread of the tire, upon a somewhat enlarged scale, showing the structure of the tire. Fig. 3 is a detached broken detail view in plan showing a form of filler fabric suitable for use in the construction of a tire in accordance with our invention. Fig. 4 is a similar view in section on the line 4, 4, Fig. 3.

In carrying out our invention we propose to employ as the principal puncture proof element of the tire, a pad composed of cotton or other fiber which has been suitably impregnated throughout the mass thereof with a solution of rubber cement and then suitably compressed. The cotton fiber may be employed in its natural state, or, if desired, it may be loosely formed into a fabric, and in either case after being impregnated with the rubber cement is compressed into a crescent shaped pad to be interposed between the inflatable inner tube and the outer shoe of the tire. Such an interposed pad, as constructed, is capable of resisting the penetration therethrough of nails, glass, tacks, or the like. In order to supplement the puncture resisting power of the impregnated cotton fiber or other fiber pad, and to insure the production of a tire which cannot be punctured under ordinary conditions, we propose to interpose layers of suitable fabric with rubber cement between the layers, between the pad and the inner tube, and also between the pad and the inner surface of the outer shoe.

In the accompanying drawing, reference numeral 5 designates the principal puncture-proof element. This is in the form of a pad, crescent shaped in transverse section, and designed to fit into the interior of an ordinary rubber or other composition shoe 6, extending throughout the circular length of the latter, the portion of greatest thickness of the pad lying opposite and parallel to the tread surface of the shoe, the pad being of tapering or decreasing thickness toward its edges from its transverse central portion. The pad 5, is composed of suitable loose fiber. We have found the fiber of Sea Island cotton to be excellently suitable for the purpose. The fiber may be employed *en masse* or, if preferred, and as shown in Figs. 3 and 4, the pad may be formed by loosely weaving or otherwise forming the fiber into a fabric 11. In either case the fibers are impregnated throughout their mass, by dipping or otherwise, with a solution of rubber or other suitable cement and compressed, thereby rendering the pad resilient but impervious to puncture.

By applying the rubber or other cement to the cotton fiber the body of the fiber when compressed into pad form is enabled to retain its shape, and also, in the use of the tire the fibers composing the pad are thereby prevented from creeping, shifting or becoming displaced relatively to each other. The use of the fabric form of pad serves the same purpose.

As above stated, and in order to insure the puncture proof characteristic of the tire when completed, we interpose layers of suitable fabric, between the pad 5 and the inner surface of the shoe, and also between the pad and the inner tube 7. These fabric layers are respectively indicated at 8 and 9. We have found that closely woven cotton fabric will answer the desired purpose, and between adjacent layers of this fabric as well as between the inner and outer surfaces of the pad and the adjacent surfaces of the fabric layers, we interpose rubber or other cement, indicated at 10. In practice we prefer to use closely woven Sea Island cotton fabric, and to employ seven of such layers 8, between the pad and the shoe and three such layers 9, between the pad and the inner tube. Between the extreme side edges of the pad and the extreme side edges of the complete tire, the inner fabric layer 8, and the outer fabric layer 9, lap upon and are cemented to each other and lie the one in contact with the other, as clearly shown in Fig. 1, and consequently the pad is firmly and efficiently bound in and held in place between the two sets of fabric layers, while at the same time the fabric layers lend strength to the tire body, increase its pressure resistance and aid in preventing puncture penetration, thereby forming a most efficient reinforcement.

It is obvious that any ordinary or well known rubber or composition shoe 6 may be employed.

The elements above described are assembled to complete the tire structure. In assembling the various elements the fabric layers 8 are cemented together and vulcanized to the inner surface of the shoe 6. The compressed pad is then cemented to the inner surface of the outer layer 8, and finally the fabric layers 9 are cemented together and to the outer surface of the pad, as shown, the extreme edges thereof lapping upon and being cemented to the inner surfaces of the layers 8. This completes the whole structure. The tire is then ready to receive the inner tube.

It is obvious that changes in details and arrangement might readily occur to persons skilled in the art and still fall within the spirit and scope of our invention as defined in the claim.

A tire constructed as described is not only rendered puncture proof but is light, strong, efficient, durable and economical to manufacture.

Having now set forth the objects and nature of our invention, and a construction embodying the principles thereof, what we claim as new and useful, and of our own invention, is,—

In a pneumatic tire structure, a shoe having a plurality of layers of fabric applied to the inner surface thereof, in combination with a pad composed of fiber impregnated with cement and compressed into crescent shape, a plurality of layers of fabric forming the inner lining of said tire and a cement binder to bind said pad against the surface of the innermost fabric layer of said first mentioned fabric layers and against the surface of the outermost fabric layer of said last mentioned layers and to bind the outermost fabric layer of said first mentioned layers to said shoe.

In testimony whereof we have hereunto set our hands in the presence of the subscribing witnesses, on this 25th day of August, A. D., 1914.

JOSEPH CLIFTON FAIR.
THEODORE A. ANDERSON.

Witnesses:
MARIE HYNES,
ARTHUR GILLIS.

Copies of this patent may be obtained for five cents each, by addressing the "Commissioner of Patents, Washington, D. C."